United States Patent
Chevalier et al.

(10) Patent No.: US 8,366,142 B2
(45) Date of Patent: Feb. 5, 2013

(54) AIRBAG MODULE COVERED WITH A PROTECTIVE COVERING

(75) Inventors: Nicolas Chevalier, Victoria (AU); Jason Svarc, Victoria (AU); Nathan Muscat, Victoria (AU); John Frendo, Victoria (AD)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/260,787

(22) PCT Filed: Apr. 14, 2010

(86) PCT No.: PCT/EP2010/002272
§ 371 (c)(1),
(2), (4) Date: Sep. 28, 2011

(87) PCT Pub. No.: WO2010/121730
PCT Pub. Date: Oct. 28, 2010

(65) Prior Publication Data
US 2012/0032423 A1   Feb. 9, 2012

(30) Foreign Application Priority Data
Apr. 21, 2009   (DE) .......................... 10 2009 018 157

(51) Int. Cl.
*B60R 21/201* (2011.01)
*B60R 21/20* (2011.01)
(52) U.S. Cl. .................. 280/728.2; 280/728.3; 280/732; 280/728.1
(58) Field of Classification Search ............... 280/728.1, 280/728.3, 732, 728.2, 742
See application file for complete search history.

(56) References Cited

U.S. PATENT DOCUMENTS

| 5,452,913 | A  | * | 9/1995  | Hansen et al. | 280/728.1 |
| 7,845,672 | B2 | * | 12/2010 | Onohara | 280/728.3 |
| 7,874,580 | B2 | * | 1/2011  | Wigger et al. | 280/732 |
| 2003/0038460 | A1 | * | 2/2003 | Sczeburek et al. | 280/728.3 |
| 2005/0225062 | A1 | * | 10/2005 | Dumbrique | 280/728.3 |
| 2006/0131843 | A1 | * | 6/2006 | Sherwood et al. | 280/728.3 |
| 2009/0132609 | A1 | * | 5/2009 | Barsness et al. | 707/203 |
| 2009/0146401 | A1 | * | 6/2009 | Wigger et al. | 280/728.3 |
| 2010/0102541 | A1 | * | 4/2010 | Shimizu et al. | 280/728.3 |

FOREIGN PATENT DOCUMENTS

| DE | 41 12 939 A1 | 10/1992 |
| DE | 101 33 968 A1 | 2/2003 |
| EP | 0 510 738 A1 | 3/1992 |
| EP | 0 783 995 A1 | 7/1997 |
| EP | 1 923 275 A3 | 5/2009 |
| JP | 11-321509 A | * 11/1999 |
| WO | WO 2009/008221 A1 | 1/2009 |

* cited by examiner

OTHER PUBLICATIONS

International Search Report—Jun. 30, 2010.

*Primary Examiner* — Ruth Ilan
(74) *Attorney, Agent, or Firm* — Brinks Hofer Gilson & Lione

(57) ABSTRACT

An airbag module has a case-like housing and an open side covered by a protective covering. The protective covering (17), having a pre-set tear line, is fastened at its one end (18) in the interior of the housing (10). With its other, free end (19), the protective covering overlaps the open side (13) of the housing (10) and is secured on a flange (14) outwardly protruding from the housing wall (12) and mounted on the housing (10). The flange (14) has at least one opening (20), immediately adjoining the transition between housing wall (12) and flange (14), for guiding a tongue (22) formed on the free end (19) of the protective covering (17). A holding nose (21) projecting from the housing wall (12) into the opening (20) can be brought into engagement into a holding recess (23) formed in the tongue (22) of the protective covering (17).

8 Claims, 2 Drawing Sheets

US 8,366,142 B2

AIRBAG MODULE COVERED WITH A PROTECTIVE COVERING

CROSS REFERENCE TO RELATED APPLICATIONS

This application claims priority to German Patent Application No. 10 2009 018 157.1, filed Apr. 21, 2009 and PCT/EP2010/002272, filed Apr. 14, 2010.

TECHNICAL FIELD OF THE INVENTION

The invention relates to an airbag module with a case-like housing having an open side, with a folded inflatable airbag and with a gas generator connected to the airbag, wherein the airbag is folded in the housing and the open side of the housing is overlapped and covered by a protective covering.

BACKGROUND OF THE INVENTION

An airbag module with the above-mentioned features is described in DE 41 12 939 A1. In the known airbag module, the protective covering is formed as a shrink film shrunk onto the housing, spanning over at least the open side of the housing. In the edge region of the housing opening, a sharp-edged strip, having saw teeth, is fastened on the outer side of the housing. When, after triggering of the gas generator, the gas pressure increases in the interior of the airbag, a corresponding pressure is exerted onto the protective covering by the airbag which is pushing outwards through the opening of the housing, allowing the protective covering to tear open along the saw tooth strip, so that the housing opening is exposed for the emergence of the airbag.

The known airbag module entails the disadvantage that the application of the shrink film is complex in the process step which is to be instituted separately.

The invention is therefore based on the problem of constructing an airbag module with the features named in the introduction, so that the mounting of the airbag module with application of the protective covering is simplified.

SUMMARY OF THE INVENTION

In its general idea, the invention provides that the protective covering, having a pre-set tear line, is fastened at its one end inside the housing, and with its other free end, overlapping the open side of the housing, is secured on a flange, protruding outwardly from the housing wall, mounted on the housing. The flange has at least one opening, directly adjoining the transition between housing wall and flange for guiding at least one tongue formed on the free end of the protective covering. A holding nose projects from the housing wall into the interior of the opening to be brought into engagement into a holding recess formed in the insertable tongue of the protective covering.

The invention firstly departs from the concept of the shrinking on of the protective covering onto the housing, entailing a particular effort, and provides a separate protective covering consisting of any suitable material, which is fastened by its one end in a suitable manner in the interior of the housing, is guided out of the housing and is then covered over the open side of the housing. In this region, overlapping the open side of the housing, the protective covering is provided with a pre-set tear line so that the protective covering, with a corresponding exertion of pressure by the inflating airbag, tears open along the pre-set tear line. To fasten the free end of the protective covering on the housing, a particular design of mounting and holding openings on the housing is provided in cooperation with holding tongues formed on the protective covering. It is important here that the free end of the protective covering is wrapped around the upper edge of the housing and is secured in a path along the associated housing wall, without gores being produced between the protective covering and the housing edge or the flange, into which the airbag could reach when being folded into the housing or into which the airbag could move on being unfolded, so that the airbag could thereby be damaged.

According to an example embodiment of the invention, over the extent of flange and housing wall on the one hand and of the associated end of the covering on the other hand, a plurality of openings and tongues of the protective covering, to be secured therein, are arranged.

According to an example embodiment of the invention, the holding nose, projecting into the opening, is arranged so as to be sunken with respect to the surface of the flange facing away from the gas generator. Hereby, a jamming of the protective covering between the flange and, for example, an instrument panel or a steering wheel cover, is prevented, which in a manner known per se with a corresponding mounting of the airbag module in the vehicle in an arrangement overlapping the open side of the housing are connected with the housing.

The transition between housing wall and the flange protruding therefrom in the region of the opening immediately adjoining the housing wall may be constructed with a rounding. Hereby, damage to the tongue of the protective covering by a rim, constructed with a sharp edge, between housing wall and flange or by a vehicle part resting on the airbag module or its flange, is avoided.

In alternative embodiments of the invention, the protective covering may be secured by its one end in the interior of the housing on the airbag, which is folded in the housing, or by means of the gas generator projecting into the housing.

In the drawings, an example embodiment of the invention is shown, which is described below.

DETAILED DESCRIPTION OF THE DRAWINGS

Figure 1:
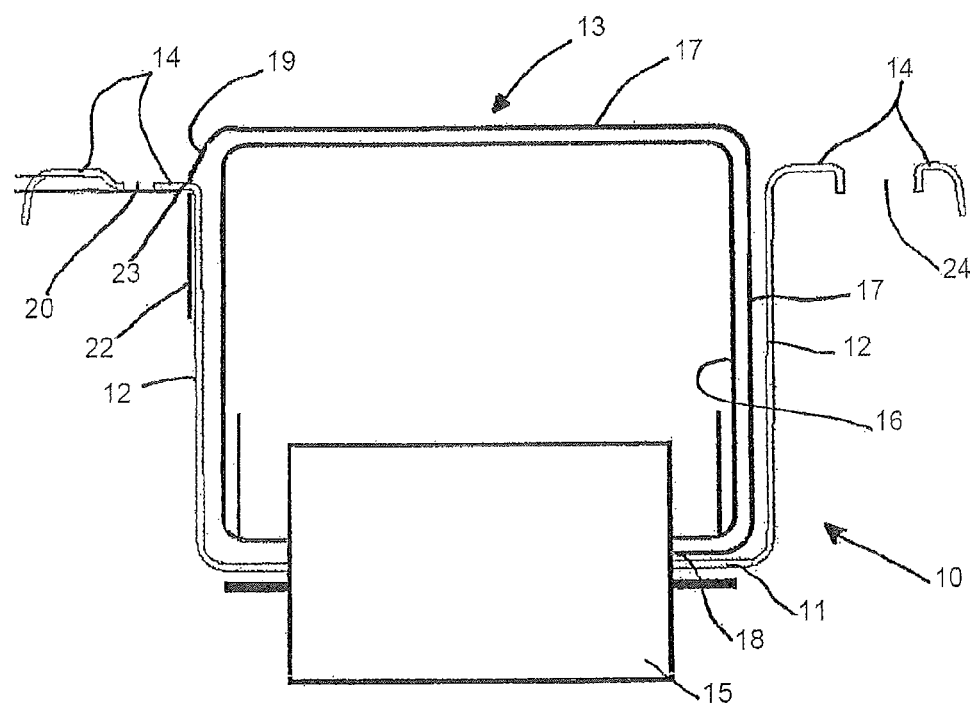
FIG. 1 shows an airbag module in a schematic side view.

The airbag module which can be seen from FIG. 1 has a housing 10 with a housing base 11 and lateral housing walls 12. The side 13 of the housing 10 lying opposite the housing base 11 is constructed so as to be open. The upper edge of each housing wall 12 is bent around into an outwardly protruding flange 14 laterally from the housing wall 12.

An inflatable airbag 16 is folded into the interior of the housing 10, which bag is connected in the deepest part of the housing in the region of its housing base 11 to a gas generator 15, which projects with a partial region through the housing base 11 into the interior of the housing 10. It can be seen that the folded airbag 16 projects at the top over the open side 13 of the housing 10. A protective covering 17 is secured by its one end 18 through the gas generator 15 in the interior of the housing 10 and is guided up along a lateral housing wall 12, encompassing the airbag 16 externally, in the direction of the open side 13 of the housing and then, overlapping the open side 13 of the housing 10, is flapped over the upper region of the folded-in airbag 16. Openings 20 are let in the opposite flange 14, which immediately adjoin the transition between the housing wall 11 and the flange 14, so that a tongue 22, constructed on the turned over free end 19 of the protective covering 17, is able to be inserted through the respective opening 20. A holding nose 21 is formed, projecting from the housing wall 11 into the interior of the opening 20, which is able to be inserted through the opening 20 in the flange 14 to secure the free end 19 of the protective covering 17 on the housing 10, and is to be secured by means of a holding recess 23, formed in the tongue 22, on the holding nose 21. As the airbag 16, folded in the housing 10, protrudes slightly over the open side 13 of the housing 10 and exerts a certain packing pressure against the protective covering 17 which is spanned over it, the tongue 22 of the protective covering 17, which is mounted with its holding recess 23 into the holding nose 21, is held under tension, so that the protective covering 17 is secured sufficiently on the housing 10.

On the side of the housing lying opposite the fastening of the protective covering 17 on the flange 14, the flange 14, running there, is provided with fastening openings 24 for the screwing on of the housing 10 on a part which is fixed to the vehicle.

Figure 2:
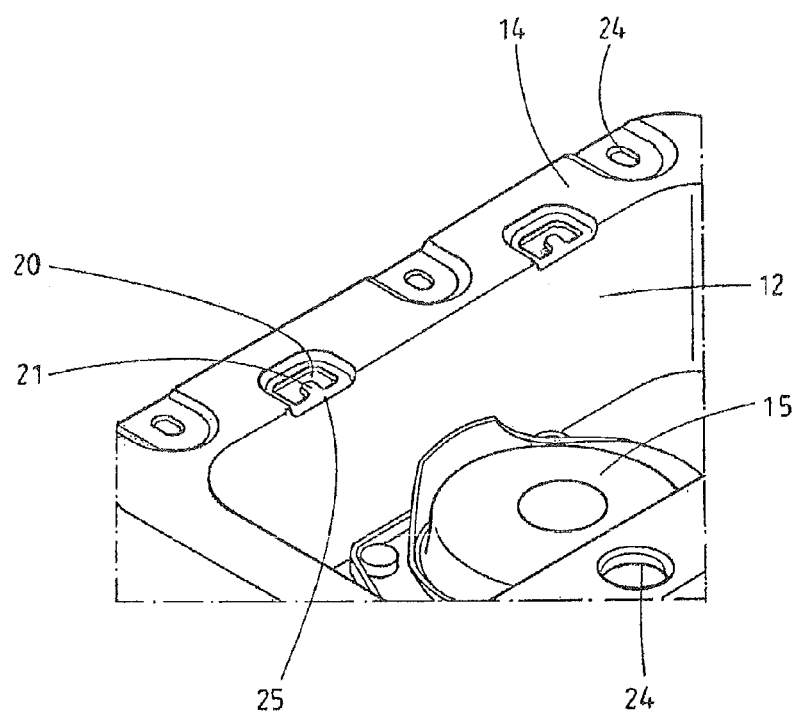
FIG. 2 shows a perspective view of a part of the airbag module with the openings serving to secure the protective covering.

It can be seen from FIG. 2 that in the respective flange region of the housing 10, two openings 20 are provided with holding noses 21, which are arranged alternating with three fastening openings 24, for fastening the housing 10, formed in this region of the flange 14. It can be seen that the openings 20 directly adjoin the transition between housing wall 11 and flange 14, so that the tongue 22, which is able to be guided through the corresponding opening 20, can be secured lying closely against the upper edge of the housing 10. In this way, the occurrence of gores is prevented, which would occur for example if the free end 19 of the protective covering 17 were drawn over the outer edge of the flange 14 and were secured here. In such a case, in fact on mounting of the airbag module, parts of the airbag 16, which is folded into the housing 10, could be placed over the upper edge of the housing wall 12 or between flange 14 and protective covering 17 drawn over it, and through the occurrence of kinks caused thereby, damage could occur to the airbag 16. Also, it would not be ruled out that on unfolding, the airbag 16 moves into such a gore and therefore an unsymmetrical stressing of the protective covering 17 is brought about with an unintentional tearing. It can be seen that the holding nose 21, projecting into the opening 20, is arranged so as to be sunken with respect to the surface of the flange 14, which lies on the side of the housing facing away from the gas generator 15. Hereby, a jamming is prevented of the protective covering 17 or of its tongue 22 between the transition of the housing wall 12 to the flange 14 by a vehicle part, such as instrument panel or steering wheel cover, placed onto the upper side of the airbag module. Furthermore, the transition between housing wall 12 and the flange 14, protruding therefrom, is constructed with a rounding 25 in the region of the opening 20, so that also hereby damage to the tongue 22 of the protective casing 17 is avoided.

The features of the subject of these documents, disclosed in the above description, the claims, the abstract and the drawings, can be essential for the realization of the invention in its various embodiments both individually and also in any desired combinations with each other.

The foregoing description of an embodiment of the invention has been presented for purposes of illustration and description. It is not intended to be exhaustive or to limit the invention to the precise embodiment disclosed. Numerous modifications or variations are possible in light of the above teachings. The embodiment discussed was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An airbag module comprising:
    a case-like housing having an open side and a housing wall (12) with a flange (14) outwardly protruding from the housing wall (12) and formed on the housing;
    a folded inflatable airbag in the housing;
    a gas generator connected to the airbag;
    a protective covering overlapping and covering the open side of the housing and having a pre-set tear line, the protective covering (17) having a first end (18) fastened inside the housing (10) and a second, free end (19) overlapping the open side (13) of the housing (10), and secured on the flange (14);
    at least one insertion opening (20) in the flange, immediately adjoining a transition between the housing wall (12) and the flange (14);
    at least one tongue (22) on the second end (19) of the protective covering (17) configured to be guided through the at least one insertion opening (20);
    a holding nose (21) projecting from the housing wall (12) into of the insertion opening (20); and
    a holding recess (23) in the insertable tongue (22) of the protective covering (17) configured to be brought into engagement with the holding nose (21).

2. The airbag module according to claim 1, wherein the at least one insertion opening is a plurality of insertion openings (20) and the at least one tongue is a plurality of tongues (22).

3. The airbag module according to claim 1, further comprising that the holding nose (21), projecting into the insertion opening (20), is recessed with respect to a surface of the flange (14) facing away from the gas generator (15).

4. The airbag module according to claim 1, further comprising that the transition between the housing wall (12) and the flange (14) is rounded in areas of the at least one insertion opening (20).

5. The airbag module according to claim 1, further comprising that the first end (18) of the protective covering is fastened to the airbag (16).

6. The airbag module according to claim 1, further comprising that the the first end (18) of the protective covering is fastened to the gas generator (15) projecting into the housing (10).

7. The airbag module according to claim 1, further comprising that fastening openings (24) are formed on the flange (14) for mounting the airbag module in a vehicle.

8. The airbag module according to claim 7, wherein the at least one insertion opening is a plurality of insertion openings (20), further comprising that the fastening openings (24) and the insertion openings (20) are arranged on the flange (14) in an alternating order.

* * * * *